United States Patent

[11] 3,601,018

[72] Inventor Howard G. Lange
Arlington Heights, Ill.
[21] Appl. No. 755,156
[22] Filed Aug. 26, 1968
[45] Patented Aug. 24, 1971
[73] Assignee Zenith Radio Corporation
Chicago, Ill.

[54] METHOD AND APPARATUS FOR EXPOSING CURVED SUBSTRATES
13 Claims, 9 Drawing Figs.

[52] U.S. Cl. ............................................. 95/1
[51] Int. Cl. ............................................. G03
[50] Field of Search ............................................. 95/1

[56] References Cited
UNITED STATES PATENTS
3,452,655 7/1969 Levin et al. .................. 95/1
3,509,802 5/1970 Burdick ........................ 95/1

*Primary Examiner*—Samuel S. Matthews
*Assistant Examiner*—Richard M. Sheer
*Attorney*—Francis W. Crotty ABSTRACT: The internal surface of the curved faceplate of a color picture tube is coated with a photosensitive material to be selectively exposed through an aperture mask which has the same general configuration as the coated surface and is positioned in approximately spaced parallel relation thereto. The exposing light source is comprised of a planar source of diffused light disposed across a simulated color axis of the color picture tube, a spherical light stop concentric with that axis and defining the internal diameter of an annulus of light, and a planar light stop having a central aperture concentric with the spherical light stop and defining the external diameter of the annulus of light. The planar light stop is movable between a first position in which one half of the annulus of light is imaged on the peripheral portions of the substrate through the aperture mask and a second position in which the remaining light source is imaged on the same portions of the faceplate. The entire annulus of light is imaged on the central portion of the faceplate in each exposure step. The dimensions and shape imposed on the annulus of light by the dimensioning and configuration of the two light stops compensates the tendency to elliptical distortion introduced to the exposure light projected onto the substrate where that distortion is attributable to the curvature of the substrate and to the fact that the light source is displaced from the center of curvature of the faceplate.

Patented Aug. 24, 1971 3,601,018

Inventor
Howard G. Lange
By Francis W. Crotty
Attorney

FIG. 4
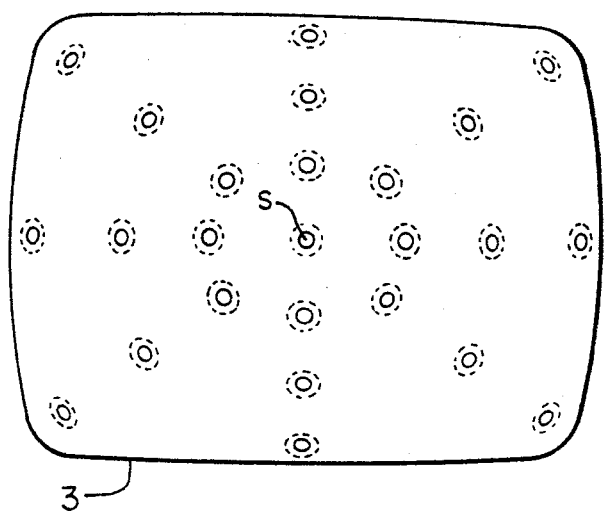
FIG. 9
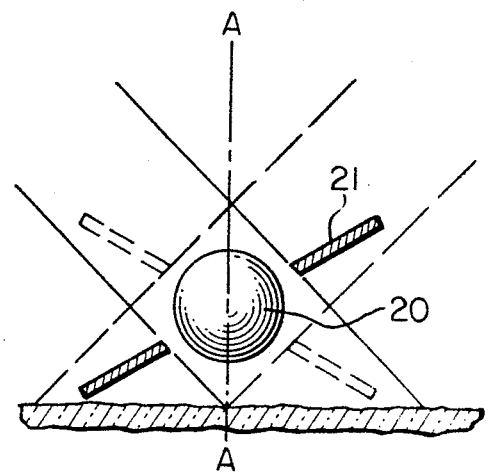
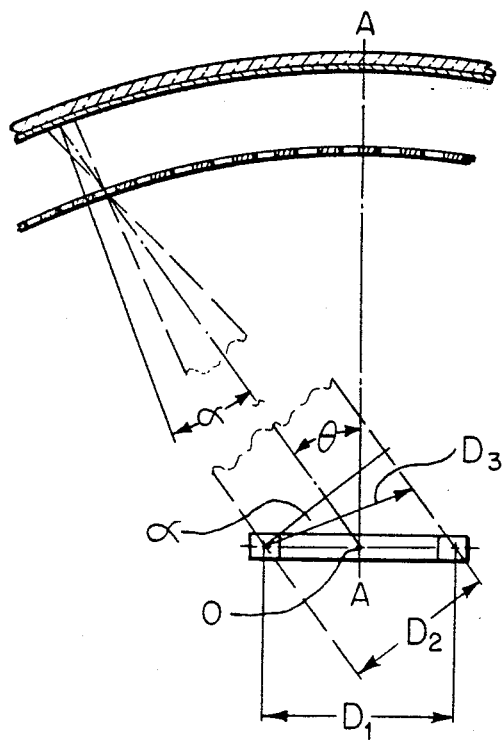
FIG. 5
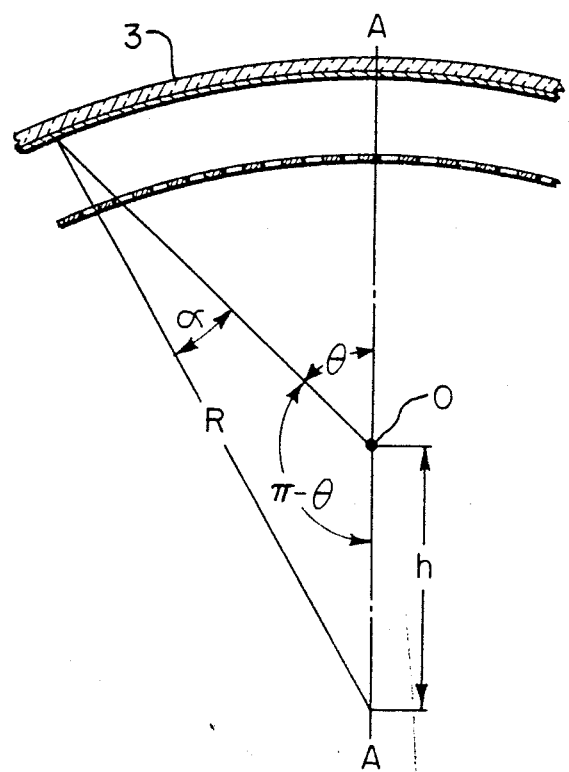
FIG. 6
Inventor
Howard G. Lange
By Francis W. Crotty
Attorney

METHOD AND APPARATUS FOR EXPOSING CURVED SUBSTRATES

BACKGROUND OF THE INVENTION

The present invention is addressed to an improved apparatus and method for exposing the internal surface of a curved substrate and, while of general utility, is especially beneficial in screening the faceplate of a color cathode-ray tube. Generally, the faceplate of such a tube is a fair approximation of a sector of a sphere.

It is commonplace today in the manufacture of color cathode-ray tubes, especially those featuring an aperture mask for the purpose of color selection, to apply over the internal surface of the faceplate a photosensitive coating which has, as an ingredient, one of the three color phosphors from which the screen is to be fabricated. Exposure of that coating through the shadow mask permits the printing of a number of dots of that particular phosphor. Repeating this general process two more times, using two other phosphor materials and with appropriate positioning of the exposure light source, completes the printing of dot triads on the faceplate. Each such triad has a dot of red, a dot of blue and a dot of green phosphor material. This procedure is now well understood in the art and indeed is currently practiced on a commercial basis. Generally, this kind of screening produces phosphor dots having a larger diameter than the apertures of the shadow mask, which is necessary for electron beam landing tolerances, and this relation of dot size to aperture size is acceptable for current commercial versions of tricolor shadow mask tubes.

A distinctly different relation of dot size to aperture size, however, is required for color tubes which feature either post-deflection-focus or what is referred to as "black surround." A color tube with post-deflection-focus has an electron lens system the purpose of which is to focus the electron beams to a reduced diameter subsequent to the plane of deflection in order to increase the percentage of electrons of the beams that may pass through the apertures of the mask and strike the assigned phosphor dots in order to attain increased brightness. Accordingly, such a tube requires that the phosphor dots be smaller in diameter than the apertures of the mask.

A color picture tube of the shadow mask variety featuring black surround is one in which the phosphor dots are surrounded by light absorbing material. Expressed differently, the spaces between the dots are filled with light absorbing material and the dots again are smaller in diameter than the apertures of the mask. Such a tube has great advantages in contrast and brightness capabilities and is described and claimed, for example, in U.S. Pat. No. 3,146,368 —Fiore et al., issued Aug. 25, 1964 and assigned to the assignee of the present invention.

Heretofore, difficulty has been experienced in printing phosphor dots on the faceplate or screen of a color cathode-ray tube where the dots are required to be smaller in size than the apertures of the mask. One difficulty, which is especially pronounced where the exposing light surface is of an annular shape positioned concentrically on the simulated color axis of the tube during screening, is the tendency of the dots to suffer elliptical distortion attributable both to the fact that the faceplate is curved and to the fact that the light source used in the screen exposure process is located closer to the faceplate than the center of curvature thereof.

Accordingly, it is an object of the present invention to provide an improved apparatus and method for exposing selected portions of the internal surface of a curved substrate, such as the inner surface of the faceplate of a color cathode-ray tube.

It is a specific object of the invention to provide an improved apparatus and method for exposing the faceplate of a color cathode-ray tube in developing phosphor dots smaller in size than the apertures of the shadow mask.

It is a very particular object of the invention to provide an improved method and apparatus for producing reduced size phosphor dots on the faceplate of a color tube and in which elliptical distortion is substantially avoided.

SUMMARY OF THE INVENTION

The method of the invention for exposing selected portions of the internal surface of a curved substrate, such as the faceplate of a color cathode-ray tube, comprises positioning in approximately spaced parallel relation to the substrate a mask having transparent and opaque portions collectively defining the exposure pattern desired for the substrate. The substrate is exposed through the mask, from an annular light source having dimensions large compared with the dimensions of the transparent portions of the mask, and in a series of N steps in each of which a fractional portion of the light source is imaged on the edge portions of the substrate. The number N of exposure steps is at least equal to two and the aforesaid fractional portions are complementary.

An apparatus for practicing that invention comprises an annular light source disposed substantially normal to a reference or central axis of the substrate and this light source comprises a first spherically shaped light stop positioned concentrically with that axis and determining the internal diameter of an annulus of light. A second, preferably planar, light stop having a circular aperture concentric with the first stop and defining the external diameter of the annulus of light is provided and is movable between first and second positions spaced along the reference axis. A source of diffused light is arranged transverse to the reference axis ans projects light through the annulus defined by the first and second light stops to expose the substrate through the aperture mask.

In one practical embodiment of the invention when the planar light stop is in one position, approximately one half of the annulus of light is imaged on peripheral portions of the substrate and when the planar light stop is shifted to its second position, the remaining half of the annulus of light is imaged in the same portions of the substrate. The entirety of the annulus of light is imaged on the central portion of the substrate in each position of the light stop. The components defining the annular light source have such dimensions and configurations that, in effect, the exposing light source viewed over the exposure cycle from any point on the substrate through the aperture of the shadow mask has an annular form which is the required condition for printing circular phosphor dots free of elliptical distortion.

DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGS. 4, 5 and 6 are views used in explaining the phenomenon of radial foreshortening and its composition;

FIG. 7 is an enlarged showing of the light source employed in the exposure chamber of FIG. 1; while FIGS. 8 and 9 show modified forms of the light source of the exposure chamber of FIG. 1.

DESCRIPTION OF THE PREFERRED EMBODIMENT

Figure 1:
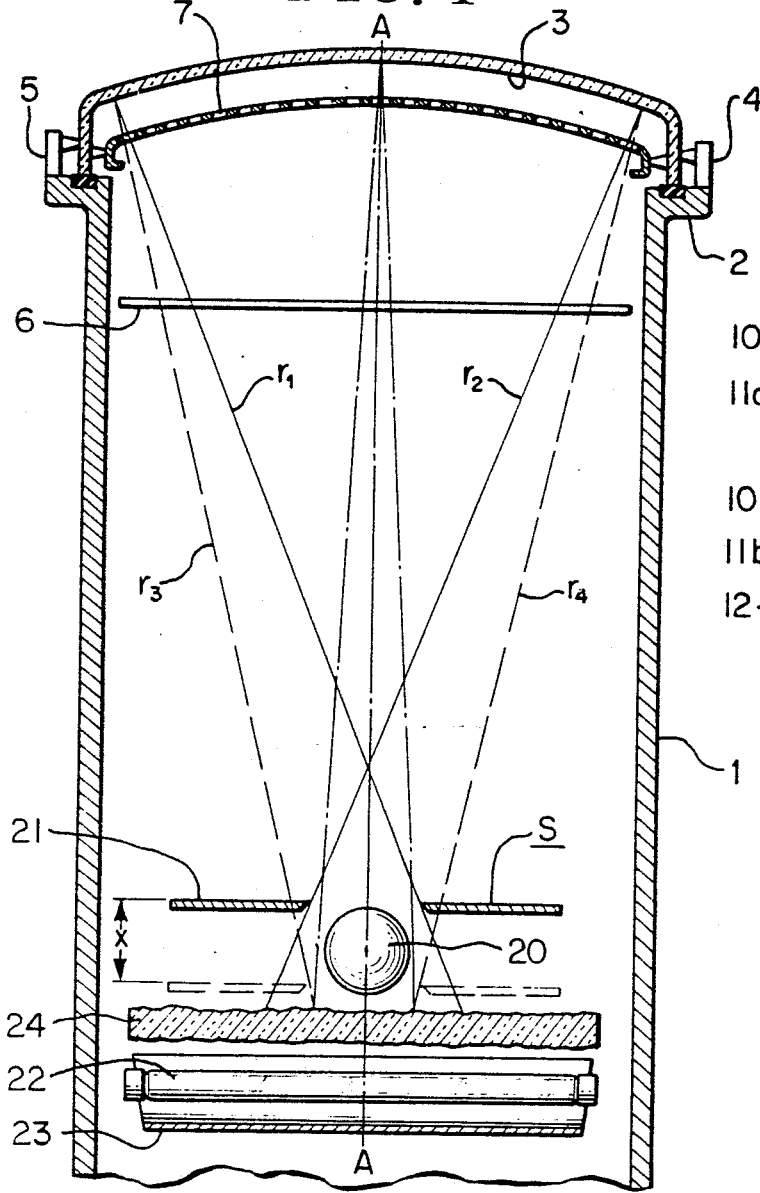
FIG. 1 is a fragmentary view, in cross section, of an exposure chamber constructed in accordance with ans for the purpose of practicing the subject invention.

The arrangement represented in FIG. 1 is referred to in the art as an exposure chamber of light house used in the screening of a cathode-ray tube for use in the reproduction of images in simulated natural color. As presently constructed, the envelopes of such tubes have two principal sections which are separate initially but are mated and bonded together to form a unitary envelope after the multicolor screen has been formed. These two principal components of the envelope are the faceplate or screen section which is rather like a shallow dish and the conical section which terminates in a narrow diameter neck at one end and at its opposite end is dimensioned and shaped accurately to correspond with the free end of the faceplate section. The cross sectional configuration of the faceplate section may be round or rectangular and either may be processed in the apparatus and with the method of the subject invention. In any event a multicolor target is laid down on the inner surface of the faceplate before it is assembled to the cone section. Since the present invention is directed solely to the screening process, and more specifically to exposure steps which constitute part of that process, nor further consideration will be given to the other steps employed in the fabrication of the complete picture tube.

It is apparent from the foregoing description that the screening process is directed to forming triads of phosphor dots in which the dot diameter, while it may be equal to or larger than, is preferably less than the diameter of the apertures of the shadow mask. Basically, the process entails coating the faceplate with a photosensitive material and then exposing selected areas of the coated faceplate with actinic radiation following which the pattern resulting from the exposure is developed. As is presently well understood, the photosensitive coating may be a composition having as ingredients a photo resist and a desired phosphor and characterized by the fact that its solubility in a solvent is controlled by exposure to actinic light. Alternatively, the faceplate may have a photoconductive coating upon which a pattern of electric charges may be established when the photoconductive coating, having first been uniformly charged, is exposed through the shadow mask to light to the end that selected portions of the coating become discharged. Flowing over the coating a toner or developer, having the appropriate polarity of charge and which includes phosphor material in suspension, permits this charge pattern to be developed in the form of deposits of phosphor material. A color tube screening process of this type is described and claimed in U.S. Pat. No. 3,475,169 issued Oct. 28, 1969 in the name of Howard Lange and assigned to the assignee of this application. It is of little consequence in using the apparatus and method of the invention whether one is dealing with a photoresist or photoconductive coating of the substrate although, for convenience, it will be assumed that the latter is the case.

Accordingly, the faceplate 3 under process will be assumed to have received an appropriate conductive layer and a superposed photoconductive coating over its internal surface which, of course, is a curved substrate usually being a close approximation to a sector of a sphere. It will further be assumed that the photoconductive coating has received a uniform charge over its entire surface and is in condition to be exposed. Faceplate 3 is shown in position in the lighthouse which comprises an enclosure 1 shown in fragmentary form. It is completely closed on all sides and faces except for the uppermost or top face 2 which is cut away to form a shelf for receiving and supporting the circumferential edge or periphery of faceplate 3 under process. The shelf 2 must be deep enough to provide firm support for faceplate 3 while permitting total exposure of the area of the screen desired to be covered with color triads. And it may be said that the shelf supports the faceplate in an exposure position in which the faceplate is substantially normal to a reference or color axis A—A passing substantially through the center of the faceplate.

Since the faceplate is to be exposed through a shadow mask, such a mask 7 is indicated as attached to faceplate panel 3. This may be accomplished in any of a variety of ways but usually studs are provided within the faceplate panel to receive mounting springs secured to the mask structure. With the mask supported on such studs, the mask is positioned and spaced in approximate parallel relation to faceplate 3 and its transparent and opaque portions collectively define the exposure pattern desired for the screen area of the faceplate. More specifically, the mask has a multiplicity of apertures which are arrayed in essentially the same pattern of distribution desired to be constructed on the screen of the faceplate. The diameter of the apertures in mask 7 may be uniform eventho for black surround it is preferred that the dot diameter decrease in the corners of the faceplate which may be controlled by exposure and penumbra effects. Locating and holding fixtures 4, 5 are attached to shelf 2 to facilitate quickly and accurately securing faceplate 3 in its exposure position. The exposure light source designated generally S and described in detail hereafter projects actinic light through a filter plate 6 to impinge upon those areas of face panel 3 to which the light rays have access through the apertures of shadow mask 7. The purpose of filter 6, as well understood in the art, is to obtain a desired pattern of light intensity over the exposed screen area of faceplate 3 in order to control dot size distribution.

Figure 2:
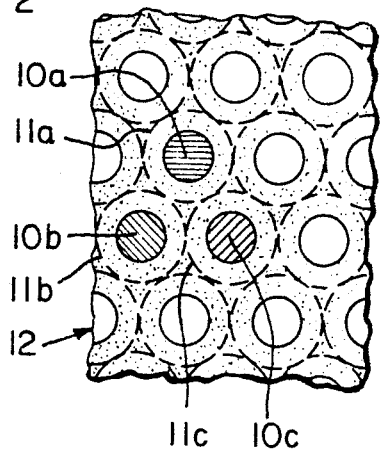
FIG. 2 is a fragmentary portion of a color tube faceplate featuring black surround.

Before considering exposure source S in greater detail, reference is made to FIG. 2 which illustrates a segment of the finished screen featuring black surround and the geometrical relationship, particularly as to size, of the electron beams of a color tube including faceplate 3 and the phosphor dots defining the color triad. An illustrative triad, for example, is comprised of the phosphor dots 10a, 10b, 10c. Their individual shading indicates that each is formed of a different phosphor material; usually one is a dot of red phosphor, another is a dot of green and a third a dot of blue phosphor. The concentric rings shown in broken-construction lines and designated 11a, 11b and 11c denote the condition in which the three electron beams of the color tube are incident on the particular triad that has been discussed and shows that they are larger in diameter than the phosphor dots of the triad. The other shading in FIG. 2, specifically that which fills the areas between the phosphor dots, denotes what has been referred to as black surround material. This is a coating of light absorbing material 12 which may, for example, be black manganese dioxide as described in Fiore U.S. Pat. No. 3,146,368. To achieve the condition of FIG. 2, the apertures of mask 7 are larger than the elemental phosphor dot areas of the screen and the mask and screen potentials are chosen to attain the electron beam diameters indicated, namely, beam sizes that are larger than the phosphor dots. As described in the Fiore patent, such a screen has distinct advantages in such properties as contrast and brightness.

Figure 3:
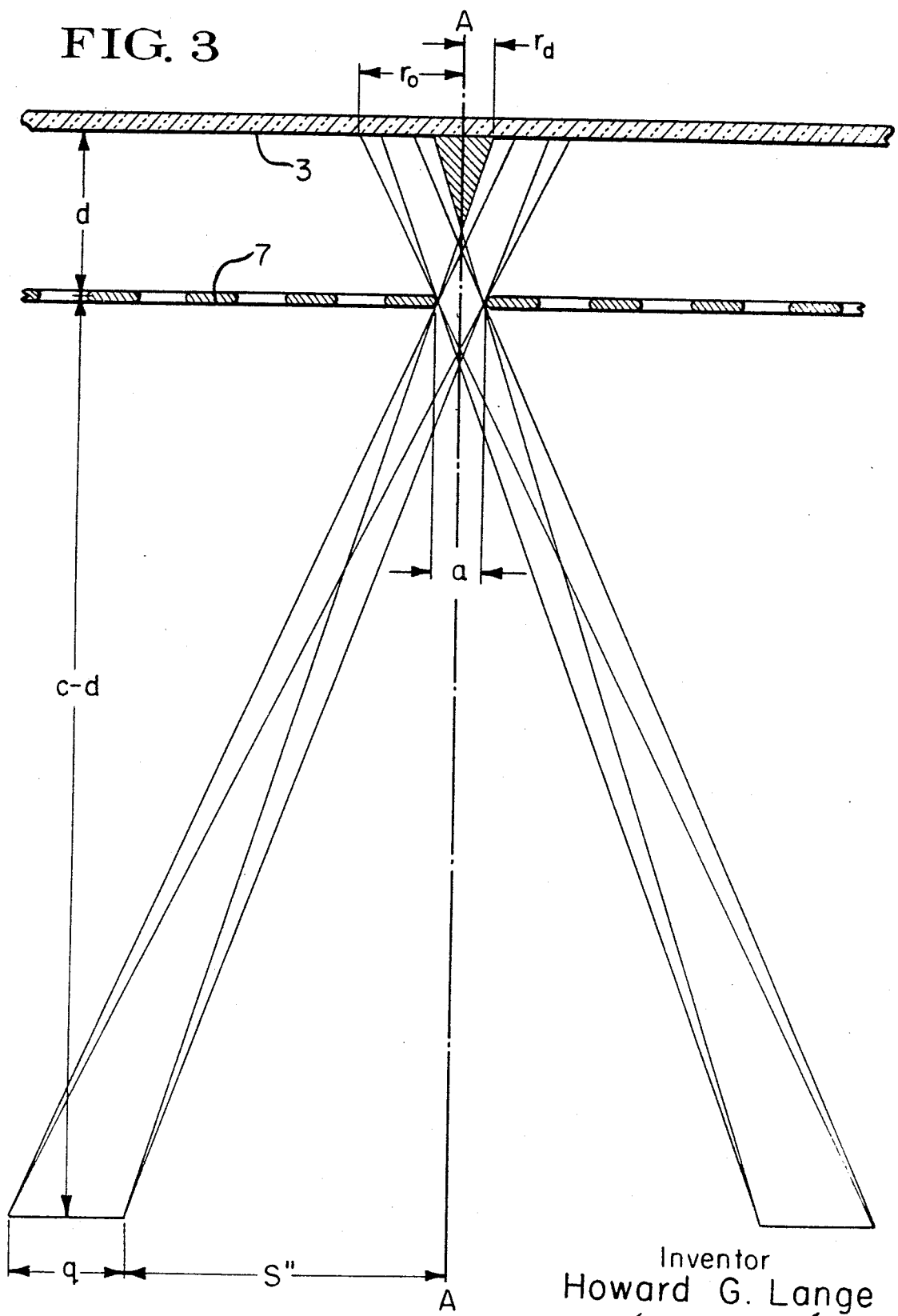
FIG. 3 is a diagram used in explaining the exposure process of the prior art.

It will be appreciated that if light source S projects exposing light of an annular shape and large compared with the diameter of the holes of mask 7, the individual mask apertures produce an effect analogous to a pinhole camera and image the light source on selected spaced elemental areas of the screen of face panel 3. The type exposure that is accomplished, at least at an elemental area of faceplate 3 that is exposed through an aperture $a$ concentric with reference axis A—A is illustrated in FIG. 3. It will be observed that there is a shaded area having a radius $r_d$ that is unexposed. Where the screening process is of the electrostatic type, this area retains a previously attained charge while the surrounding and exposed area is discharged. Accordingly, if a suitably charged phosphor electrophotographic developer is flowed over the faceplate, phosphor will be deposited in the unexposed area only. This would correspond to the elemental area of faceplate 3 that represents a single phosphor dot. Of course, where photosensitive resist screening is employed, the exposed area is soluble in a suitable solvent whereas the unexposed area is insoluble in this solvent so that washing the faceplate in this solvent, after exposure, develops a phosphor dot in the shaded area.

The size of the unexposed area may be determined by the geometry of the arrangement. In particular, the internal diameter $2S''$ of the annulus of exposing light and its width $q$, in terms of the geometry of the illustrated arrangement are:

$$S''=[(c-d)/d][r_a+a/2]+a/2 \quad (1)$$
$$q=[(c-d)/d][r_a-r_a-a-a] \quad (2)$$

where,
- $a$ is the diameter of the mask aperture
- $c$ is the spacing of light source S from faceplate 3
- $d$ is the spacing of mask 7 from faceplate 3
- $r_o$ is the maximum radius of the light projected through aperture $a$. Obviously, for a light source of fixed dimensions the radius $r_d$ and the dot size will vary with distance $d$ and may be made equal to or larger than aperture size $a$. Of greatest interest at the moment, however, is printing dots that are smaller than the aperture size.

Ideally, the projected light pattern is an annulus or ring at all points of the screen exposed through mask 7 but experience shows that this optimum condition is not realized in practice. Indeed, a condition like that represented in FIG. 4 will be encountered. It will be observed that in the center of face panel 3 the projected light image s is annular in shape but it distorts with angular displacement from the center of the screen, being most severely distorted at the edges of the screen area. The distortion is a foreshortening of the light image in the plane of the paper, causing the remote images to be elliptical in appearance. This is known as radial foreshortening and is essentially the same phenomena discussed in U.S. Pat. No. 3,226,229 issued to Sam H. Kaplan on Dec. 28, 1965.

The dependence of the amount of distortion on angular displacement from reference axis A—A is clear from the fragmentary view of FIG. 5 showing the conditions with respect to an elemental area of screen 3 which is at an angle $\theta$ with respect to the reference axis which is an axis through the center O of light source S and normal to the center of the faceplate. If the light source S has a mean diameter $D_1$, its effective diameter $D_2$, viewed in the direction of the elemental area of the screen under consideration, is reduced as a function of angle $\theta$.

$$D2 = D_1 \cos \theta \quad (3)$$

This formula for foreshortening applies for the case when the center of curvature of the faceplate is coincident with the center of the light source. Clearly, the effective width of light source varies with angle $\theta$ and foreshortening is seen to increase to a maximum at the edges of the screen.

To avoid this distortion, the method of the invention is one in which faceplate 3 is exposed in series of N exposure steps, where N is an integer at least equal to 2. In each such exposure step the light from source S as imaged on the substrate through the mask varies gradually from a ring at the central portion of the faceplate to decreasing fragmentary portions of a ring as the angle $\theta$ to the elemental area increases. But the fragmentary portion of the light annulus imaged on portions of the faceplate in one exposure step is not the same as that imaged on the same portions of the faceplate in the other steps of the series; in fact, they complement each other so that every elemental area of the screen is, in effect, exposed from an annulus of light in each complete exposure sequence. Accordingly, the entirety of the screen is exposed only through the complete series of exposure steps.

It is convenient in practicing the invention to utilize a two-step exposure sequence in which case one half of the annulus of light from source S is imaged on the peripheral portions of the faceplate in each exposure step. The mechanism of FIG. 1 accomplishes this specific process.

The annular light source S of FIG. 1 comprises a first spherically shaped light stop 20 positioned concentrically with the reference axis A—A and dimensioned to determine the internal diameter of the annulus of light. There is a second light stop 21 which is preferably a planar member such as a disc having a circular aperture concentric with spherical stop 20 but having a larger diameter to determine the external diameter of the annulus of light. The second stop 21 is movable between first and second positions spaced along axis A—A in accordance with the following:

$$X = (2q + D_o) \tan B \quad (4)$$

where $D_o$ is the diameter of sphere 20 and angle B is one fourth the full deflection angle of the color tube e.g. 22.5° for a 90° tube. The first position is shown in full-line construction in FIG. 1 and the alternative position is indicated in broken line construction. The mechanism for moving disk 21 from one position to the other is a matter of simple mechanics and has been omitted to avoid confusing the drawing. Finally, there is a planar source of diffused light disposed transverse to axis A—A and projecting light though the annulus defined by the outer surface of stop 20 and the perimeter of the aperture in disc 21. A convenient form of a diffused source of light may be provided by a mercury lamp 22 backed by a reflector 23 and positioned under a light diffuser such as a ground glass or quartz plate 24. Plate 24 has overall dimensions large compared with the aperture or plate 21.

In the first exposure step disc 21 is in the full-line position and the half of faceplate 3 to the left side of axis A—A sees only portions of diffusion plate 24 which lie to the right or opposite side of reference axis A—A indicated by illustrative ray $r_1$. Almost all of this half of the faceplate is shadowed by the opaque portion of disc 21 to the left of axis A—A. Consequently, on the left edge or periphery of faceplate 3 only that half of the annulus of light disposed to the right of the reference axis is imaged through the edge aperture of mask 7. For the same exposure, the half of faceplate 3 to the right of axis A—A sees only portions of diffusion plate 24 to the left of axis A—A as shown by representative ray $r_2$. The opaque portion of disc 21 to the right of axis A—A shadows most of this half of faceplate 3 from the portion of diffusion plate 24 to the right of the axis. Hence, only the half of the light annulus to the left of the reference axis is imaged on the right edge or periphery of faceplate 3 through mask 7. The central portion of the screen, however, sees a complete annulus of light as indicated by the rays represented in dash-dot outline. As a consequence, elemental areas in the central portion of the faceplate receive images of the whole annulus of light defined by components 20–24 whereas elemental areas at the extreme edges of the faceplate receive images of essentially half an annulus of light and the transition between these extremes is gradual.

When stop 21 is shifted to its broken line position, the conditions change in that those portions of faceplate 3 to the left of reference axis A—A now see predominantly portions of diffusion plate 24 to the left of the reference axis as indicated by ray $r_3$. Most of this half of the faceplate is now shielded from the portion of plate 24 to the right of axis A—A by the opaque portion of disc 21 on the same side of that axis. In this exposure step, the half of the annulus of light to the left of the reference axis is imaged on the left edge or periphery of faceplate 3 through mask 7, completing its exposure to the whole ring of light. At the same time, edge portions of faceplate 3 to the right of the reference axis see only parts of the diffusion plate which likewise are to the right of the axis as represented by ray $r_4$, imaging that half of the annulus of light on such edge portions. In other words, complementary portions of an annulus of light are imaged in the two exposure steps on those portions of the faceplate that are sufficiently displaced from reference axis A—A to be exposed in either step to less than all of the annulus of light. Because the central area of the faceplate is exposed in both steps by the entire annulus of light, filter 6 has a pattern of light transmission selected to the end that the integrated exposure, that is the intensity-time product, for all elemental areas of faceplate 3 is essentially the same. This, of course, means that filter 6 is less transparent at its center than at its edge portions.

Figure 7:
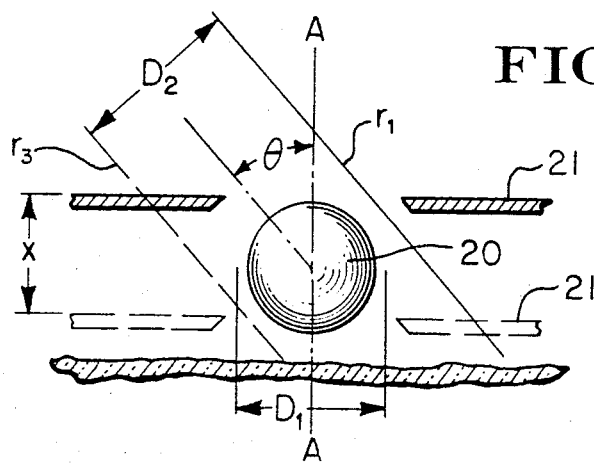

The described two step exposure compensates the tendency toward elliptical distortion, explained in conjunction with the diagrams of FIGS. 4 and 5 which show that the effective width $D_2$ of a ring of light when viewed off reference axis A—A is reduced relative to its actual dimension $D_1$. By way of further explanation, FIG. 7 is an enlarged diagram of light source S of FIG. 1, showing how the relative width of the exposing light now changes as viewed along axis A—A and as viewed from the edge of the screen area which is at an angle $\theta$ to that axis. Along reference axis A—A the exposing light is annular in shape and its mean diameter has the dimension $D_1$. Viewed at angle $\theta$ to the reference axis and taking into account both steps of the exposure sequence, the exposing light again is annular in shape but its width, as shown by dimension line $D_2$, has now been effectively increased to the value $D_1$. In constructing this diagram, a light ray to the screen area in question, with disc 21 in its full-line position, is represented by full line $c_1$. With disc 21 in its broken line position, the ray to this same area of the screen is designated by broken line $r_3$. By dimensioning the diameter of spherical light stop 20, the aperture of light stop 21 and the axial displacement $x$ of the two positions of disc 21, one may control the exposure to the end that, even at the edges of the faceplate, elemental areas are, in effect, exposed to an annulus of light of uniform dimension as required to avoid elliptical distortion.

Thus far, no consideration has been given to the effect on radial foreshortening of the annular light source attributable to the fact that the center of curvature of the faceplate and the center of the light source are not coincident. The effect of this factor is made clear in FIG. 5 by the angle $\alpha$ which is the angle defined by the direction line from the center of the light source to the observation point and a line normal to the faceplate at that point. It represents, in effect, the angle of the incident beam relative to a normal to the surface being exposed. When this factor is brought into consideration, the effective width of the light source is $D_3$ and its relation to dimension $D_2$ is as follows:

$$D_2 = D_3 \cos \alpha \quad (5)$$

In terms of $\theta$ this formula can be written as:

$$D_2 = \frac{D_3 \sqrt{R^2 - h^2 \sin^2 \theta}}{R} \quad (6)$$

where R is the radius of curvature of faceplate 3, $h$ is the spacing along reference axis A—A of the center O of the light source from the center of curvature of the faceplate.

Figure 8:
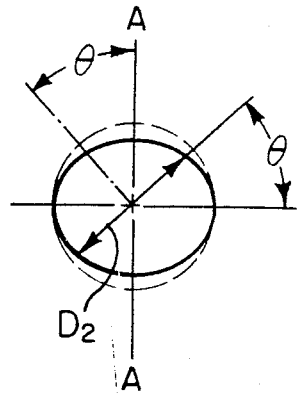

This expresses what the dimension of the source should be perpendicular to the line from the source to the area under consideration on the faceplate. Equation (6) permits spherical stop 20 to be shaped for optimum compensation. While in many instances, a simple sphere will suffice for element 20 of light source S more precise results are obtainable by shaping of this sphere as indicated in FIG. 8. The dimension $D_2$ may be computed for various values of angle $\theta$ to attain the degree of precision desired.

FIG. 9 represents a modified arrangement, differing principally from FIG. 1 in that planar light stop 21 is canted relative to reference axis A—A and is rotatable on an axis that is coincident therewith. In this case, one extreme position of disc 21, shown in full-line construction, exposes predominantly one-half of faceplate 3 while the other extreme position, shown in broken line construction, exposes largely the other half of the faceplate. The disc may be controlled to be in one or the other of these extreme positions or, if desired, it may rotate continuously for a given exposure period.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. The method of exposing selected portions of the internal surface of a curved substrate which comprises:
   positioning in approximately spaced parallel relation to said substrate a mask having transparent and opaque portions collectively defining the exposure pattern desired for said substrate;
   and exposing said substrate through said mask, from an annular light source having dimensions large compared with the dimensions of said transparent portions of said mask, and in a series of N exposure steps in each of which a fractional portion of said light source is imaged on the edge portions of said substrate, where N is an integer at least equal to 2 and where said fractional portions are complementary.

2. The method as defined in claim 1 in which said light source is imaged on said substrate in two sequential steps in each of which at least half said light source is imaged.

3. The method as defined in claim 2 in which one half of said light source is imaged on the peripheral portions of said substrate in the first exposure step, in which the other half of said light source is imaged on the same peripheral portions of said substrate in the second exposure step, and in which the entirety of said light source is imaged on the central portion of said substrate in at least one of said exposure steps.

4. The method as defined in claim 2 in which said substrate has a predetermined radius of curvature and in which said light source is positioned concentrically of a reference axis at a distance from said substrate that is less than said radius of curvature.

5. The method as defined in claim 4 in which said light source is dimensioned in relation to the radius of curvature of said substrate and the angle between said reference axis and the edge of said substrate to project on the edge of said substrate in the first exposure step an arcuate pattern of light and to project thereon in the second exposure step a complementary arcuate pattern of light which, in conjunction with said first pattern, defines a ring pattern of light of a desired predetermined diameter.

6. The method as defined in claim 5 for exposing the internal surface of the curved substrate from an annular light source comprising a first spherically-shaped light stop determining the internal diameter of said source, a second light stop having circular aperture concentric with said first stop and determining the external diameter of source and a secondary diffused light source projecting light though the annulus defined by said light stops, which method comprises:
   positioning said second light stop at a first position on said reference axis to image approximately one half of said light source on said substrate in the first exposure step;
   and positioning said second light stop at a second position on said reference axis to image the reminder of said light source on said substrate in the second exposure step.

7. The method as defined in claim 6 in which said first position of said second light stop exposes certain portions of said substrate to one-half of the annulus of light projected from said source;
   and in which said second position of said second light stop exposes said portions of said substrate to the remaining half of the annulus of light.

8. The method as defined in claim 7 in which said first position of said second light stop exposes said portions of said substrate on one side of said reference axis to the half of the annulus of light on the opposite side of said axis.

9. Apparatus for exposing selected portions of the internal surface of a curved substrate which comprises:
   A mask in approximately spaced parallel relation to said substrate having transparent and opaque portions collectively defining the exposure pattern desired for said substrate; second light circular
   and an annular light source disposed substantially normal to a reference axis of said substrate, said light source comprising a first spherically shaped light stop positioned concentrically with said axis and determining the internal diameter of an annulus of light, a second light stop having a circular aperture concentric with said first stop and defining the external diameter of said annulus of light and movable between first and second positions spaced along said reference axis, and a source of diffused light transverse to said reference axis and projecting light through the annulus defined by said first and second light stops.

10. Apparatus in accordance with claim 9 in which said first position of said second stop exposes certain portions of said substrate to approximately one half of said annular light source and in which said second position of said second light stop exposes said portions of said substrate to the remaining half of said annular light source.

11. Apparatus in accordance with claim 10 in which said second light stop is a planar opaque disc having a centrally located aperture, having a dimension in the direction of said axis that is small compared with the diameter of said spherically shaped first stop and disposed normal to said axis for displacement between said first and second positions.

12. Apparatus in accordance with claim 11 in which the diameter of said spherically shaped first stop is nonuniform to compensate the tendency of the curvature of said substrate to introduce elliptical distortion to the pattern of light projected from said annular light source onto portions of said substrate that are displaced from said reference axis.

13. Apparatus in accordance with claim 12 in which said spherically shaped first stop has a maximum diameter in a plane normal to said reference axis and a diameter which decreases with angular displacement in either direction from said normal plane.